United States Patent
D'Silva et al.

(10) Patent No.: US 10,801,273 B2
(45) Date of Patent: Oct. 13, 2020

(54) FRICTION BASED THREAD LOCK FOR HIGH TORQUE CARRYING CONNECTIONS

(71) Applicant: Halliburton Energy Services, Inc., Houston, TX (US)

(72) Inventors: Alben D'Silva, Edmonton (CA); Neil Roy Choudhury, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 677 days.

(21) Appl. No.: 15/520,244

(22) PCT Filed: Nov. 24, 2014

(86) PCT No.: PCT/US2014/067103
§ 371 (c)(1),
(2) Date: Apr. 19, 2017

(87) PCT Pub. No.: WO2016/085448
PCT Pub. Date: Jun. 2, 2016

(65) Prior Publication Data
US 2017/0306707 A1    Oct. 26, 2017

(51) Int. Cl.
E21B 17/043    (2006.01)
F16L 15/04     (2006.01)
E21B 17/02     (2006.01)

(52) U.S. Cl.
CPC ............ *E21B 17/043* (2013.01); *F16L 15/04* (2013.01); *E21B 17/02* (2013.01)

(58) Field of Classification Search
CPC ......... E21B 17/043; E21B 17/02; F16L 15/04
USPC ........................................................ 285/92
See application file for complete search history.

(56) References Cited

U.S. PATENT DOCUMENTS

| | | | | |
|---|---|---|---|---|
| 2,864,629 A * | 12/1958 | Hall, Sr. | ................. | E03B 3/08 285/81 |
| 2,931,670 A * | 4/1960 | Church | ................. | E21B 17/043 285/81 |
| 3,702,707 A * | 11/1972 | Rosan, Sr. | ............. | F16B 39/10 285/23 |
| 4,261,599 A * | 4/1981 | Streed | ................... | F16L 37/113 285/362 |
| 4,659,119 A * | 4/1987 | Reimert | ............... | E21B 17/043 285/82 |
| 5,255,751 A | 10/1993 | Stogner | | |
| 6,543,556 B1 | 4/2003 | Anderson et al. | | |

(Continued)

FOREIGN PATENT DOCUMENTS

WO    2013049627    4/2013
WO    2013101852    7/2013

OTHER PUBLICATIONS

International Patent Application No. PCT/US2014/067103, "International Search Report and Written Opinion", dated Jul. 29, 2015, 14 pages.

*Primary Examiner* — James M Hewitt, II
(74) *Attorney, Agent, or Firm* — Kilpatrick Townsend & Stockton LLP

(57) ABSTRACT

Device for allowing downhole drilling tubing to withstand greater torques. There is provided a tube segment that can experience a higher torque without the need for increasing the tube or thread size. Certain examples provide for a roller or sprag configuration positioned with respect to the tube segment that allows the tube segment to withstand higher torques.

18 Claims, 6 Drawing Sheets

(56) References Cited

U.S. PATENT DOCUMENTS

| | | |
|---|---|---|
| 7,506,564 B2 | 3/2009 | Schulze-Beckinghausen |
| 7,793,989 B2 | 9/2010 | Pinckney |
| 8,690,200 B1 * | 4/2014 | Patterson, Jr. .......... E21B 17/08 |
| | | 285/403 |
| 2003/0075023 A1 | 4/2003 | Robichaux |
| 2003/0168858 A1 | 9/2003 | Hashem |
| 2004/0046388 A1 | 3/2004 | Slack et al. |
| 2004/0090068 A1 | 5/2004 | Evans et al. |
| 2004/0251686 A1 | 12/2004 | Otten et al. |
| 2005/0062288 A1 | 3/2005 | Alaria |
| 2008/0047716 A1 | 2/2008 | McKee et al. |
| 2010/0096234 A1 | 4/2010 | Liang |
| 2012/0267170 A1 | 10/2012 | Langenfeld et al. |
| 2013/0020072 A1 | 1/2013 | Leng et al. |
| 2014/0103640 A1 * | 4/2014 | O'Dell ................. E21B 17/046 |
| | | 285/91 |
| 2014/0103645 A1 * | 4/2014 | Steen .................... F16L 15/08 |
| | | 285/330 |
| 2014/0167408 A1 * | 6/2014 | Steen .................... F16L 15/08 |
| | | 285/330 |
| 2014/0215789 A1 | 8/2014 | Becker |

* cited by examiner

FRICTION BASED THREAD LOCK FOR HIGH TORQUE CARRYING CONNECTIONS

CROSS-REFERENCE TO RELATED APPLICATIONS

This is a U.S. national phase under 35 U.S.C. 371 of International Patent Application No. PCT/US2014/067103 titled "Friction Based Thread Lock For High Torque Carrying Connections" and filed Nov. 24, 2014, the entirety of which is incorporated herein by reference.

TECHNICAL FIELD

The present disclosure relates generally to devices for use with downhole drilling strings and tools that experience and withstand a high torque environment within a wellbore.

BACKGROUND

Various devices may be utilized in a well traversing a hydrocarbon-bearing subterranean formation. Downhole strings are often formed from individual lengths of drill pipe, casing, or tubes that are connected to one another end-to-end. Some of these connections may be threaded connections. Many such devices are configured to be actuated, installed, or removed by a force applied to the device while disposed in the well. This force may be an applied torque. For example, two lengths of pipe may be twisted or rotated in order to tighten or loosen the connection. However, applying a torque above a component's threshold may result in stripping or otherwise damaging a segment shoulder, a threaded connection, or other connection.

DETAILED DESCRIPTION

Certain aspects and examples of the disclosure herein are directed to a device for allowing downhole tubular segments to withstand greater torques. Certain examples may allow a tube segment to experience a higher torque without the need for increasing the tube or thread size. Certain examples provide for a wedging element, such as a roller or a sprag or other configuration, positioned with respect to a tube segment that allows the tube segment to withstand higher torques.

Figure 1:
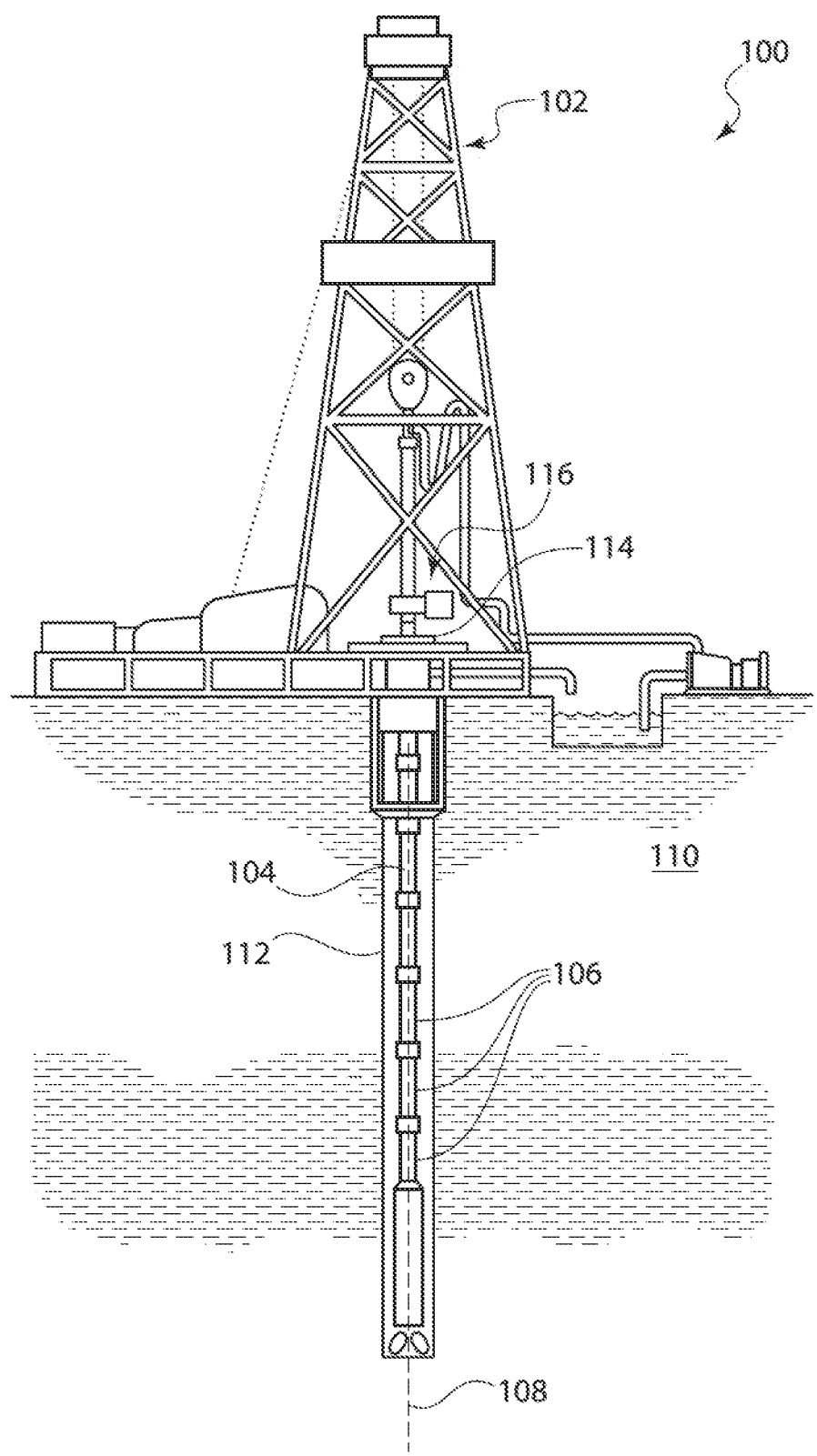
FIG. 1 is a schematic illustration of a drilling system that may use the connections disclosed.

Referring now to FIG. 1, there is shown a drilling system 100. Drilling system 100 may include a derrick 102 with components that help support a string 104. The string 104 may be a drill string, a casing string, a production string, or any other component made up of more than one tubular pipe segment. The string 104 may include multiple pipe segments 106 (also referred to in the industry as "joints") that are connected together end-to-end. The string 104 has a longitudinal axis 108 about which the string 104 may be rotated. The string 104 may be advanced into the subterranean formation 110 through a wellbore 112. As the string 104 penetrates deeper into the formation 110, additional pipe segments 106 may be added. As the string 104 is removed from the wellbore 112, pipe segments 106 may be removed.

A well traversing a hydrocarbon-bearing subterranean formation may be constructed by drilling the wellbore using an initial tubular string of drill pipe. The individual tubulars that form the drill pipe may form the string by being connected to one another. The tubular string of drill pipe may be removed, and a second tubular string, referred to as casing, may be cemented into place. Production string may be run into the casing. Advances in drilling technology have enabled the wellbore to be drilled and completed with a single casing string, eliminating the need for two trips down the hole. The string 104 referred to herein may thus be comprised of any type of tubular pipe used in a wellbore. Non-limiting examples include drill pipe, a tubular string that forms the casing, a combination casing string, a production string, or any other appropriate tubular or pipe segment. The connection disclosure provided may also be used with any other threaded connection points.

As new segments 106 are added or removed, there may be a support system 114 that prevents rotation of the string 104 along its longitudinal axis 108. A rotatable system 116 may also be provided, which grips and rotates various pipe segments 106 to attach or disengage the segments 106 to or from the string 104.

The pipe segments 106 may each have two male threaded ends, sometimes referred to in the industry as "pins." A female thread receiving "box" may receive and connect the male ends. It is also possible for each segment to have a threaded male end and a female thread receiving end. Whichever option is used, the configuration allows the pipe segments 106 to be connected end-to-end, as shown in FIG. 1. The threaded engagement between a properly secured pin and box connection is generally effective in maintaining a secure mechanical connection that holds the string 104 together. This may effectively seal the internal area of the string from the formation 110 environment. However, as drilling technology advances and as performance requirements for the torque capacity of the pipe/casing string increase, it is desirable to create improvements that allow string connections to withstand increased torque capacity.

Increasing tool sizes so that they may accommodate greater torque is not a desirable option. Wellbore size limitations generally prevent components from being enlarged, such that they may accommodate greater torque. Accordingly, as the torque requirements in downhole drilling tools continues to increase for a given tool size, various alternative types of connections are being explored.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative aspects, like the illustrative aspects, should not be used to limit the present disclosure. The following sections use directional descriptions such as "above," "below," "up," "down," "upper," "lower," "upward," "downward," "left," "right," "uphole," "downhole," etc. in relation to the illustrative aspects as they are depicted in the figures, the upward direction being toward the top of the corresponding figure and the downward direction being toward the bottom of the corresponding figure, the uphole direction being toward the surface of the well and the downhole direction being toward the bottom of the well. Like the illustrative aspects, the numerals and directional descriptions included in the following sections should not be used to limit the present disclosure.

Figure 2:
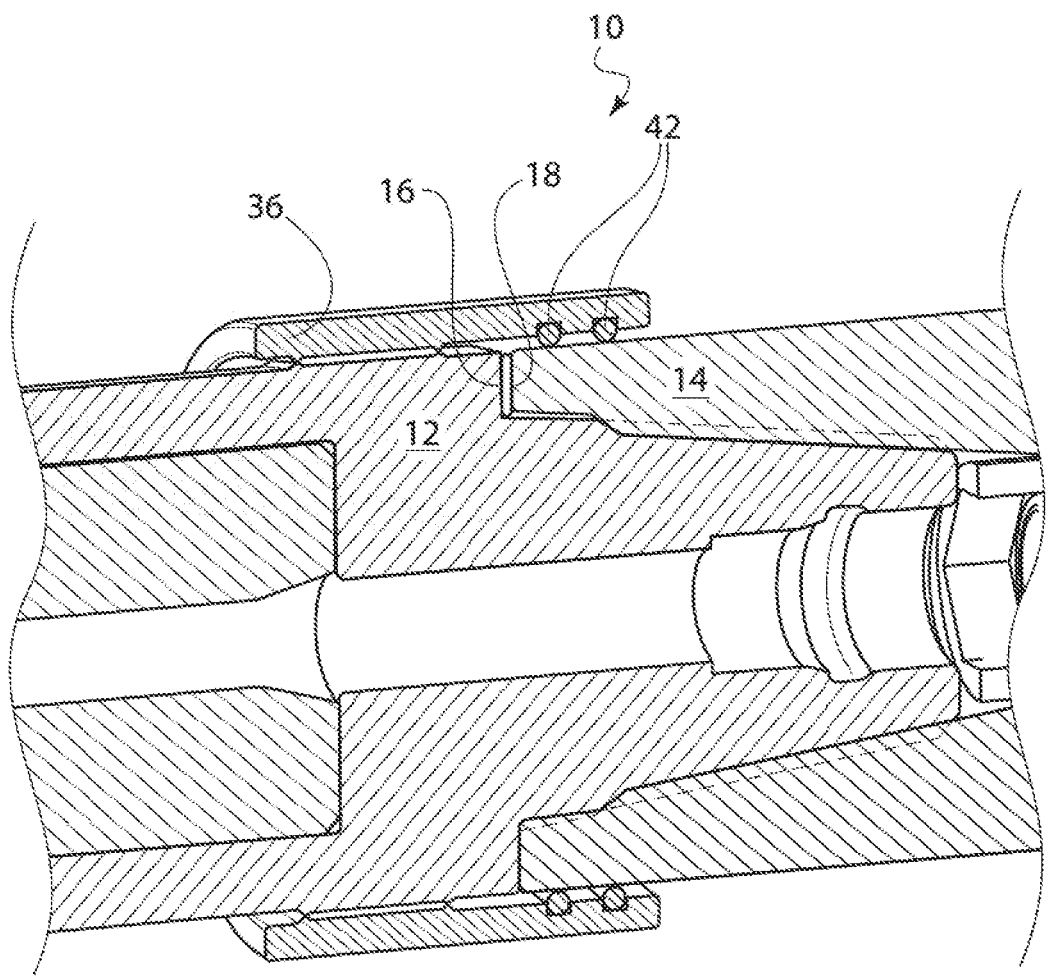
FIG. 2 is a side cross-sectional view that shows one example of a high torque connection.

There is thus provided an improved connection 10 between two segments 12, 14. As shown in FIG. 2, the two elements may be a male tubular segment 12 and a female tubular segment 14. The male segment 12 may have a shoulder 16 that abuts a corresponding female shoulder 18. When the two segments 12, 14 are rotated with respect to one another and if the torque exceeds certain limits, segment 12 may stretch and fail. In order to allow the connection to handle a higher torque prior to failing, the shoulder 16 may be provided with a series of wedges 20 that receive one or more needle rollers 22. As detailed further below, a needle roller 22 may become lodged in a wedge 20, such that the needle roller 22 experiences some of the torque that would otherwise be borne solely by the segment shoulder 16. The needle roller 22 may function as a wedging element. The needle roller 22 may become radially constrained in the wedge.

Figure 3:
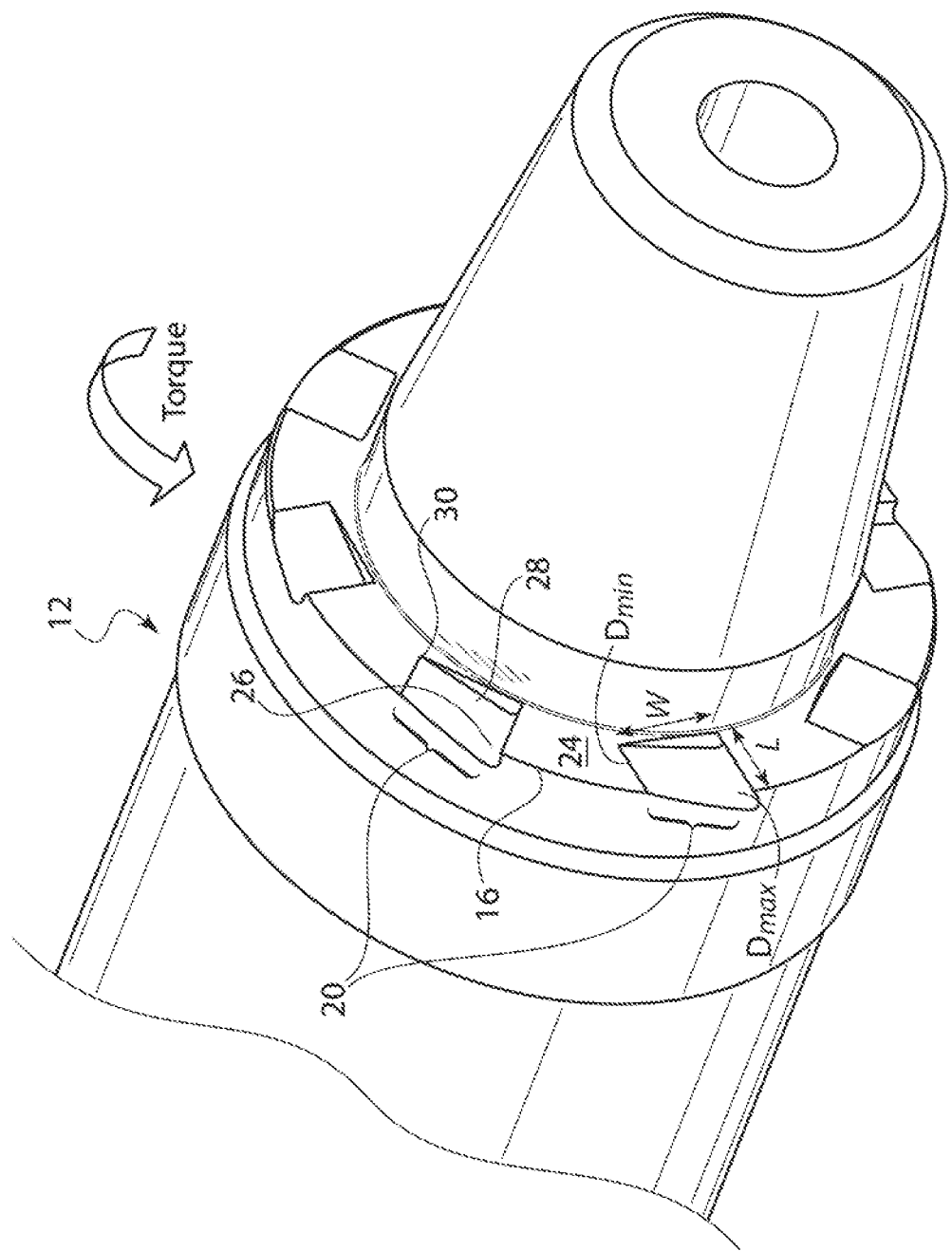
FIG. 3 is a front perspective view that shows a male segment having wedges for use with a high torque connection.

As shown in FIG. 3, in one example, each wedge 20 may be formed as tapered cut-out area that extends along a circumferential face 24 of the shoulder 16. The wedges 20 may extend circumferentially along the shoulder 16. The wedges 20 may have a triangular-like cross-sections. The wedges 20 may have a curved groove 26 at a deep-most portion of the wedge 20. Curved groove 26 may be dimensioned in order to receive/support a needle roller 22, as outlined below. Curved groove 26 is shown as the left-most portion of each wedge 20 in FIG. 3. Although shown and described as a curved groove, it may also be possible for this feature to be provided as an angular groove that does not have a curved portion, but instead provides one or more flat faces. Although the needle roller may not sit as securely in such a flat or angular groove, it may be easier to machine from a manufacturing perspective.

The wedge 20 may have a gradual taper 28 that extends away from the curved groove 26, toward a wedge tip 30. This taper 28 may be any appropriate angle or distance. In one example, the taper 28 may be provided as shallow as possible in order to contain and pinch, wedge, or lodge the needle roller between segments 12 and 14. The smaller the taper 28, the shorter the distance that the needle roller must travel in order to begin receiving the torque load. In one example, the taper 28 may be about 10 to about 15 degrees. In another example, the taper may be about 12 to about 13 degrees. It should be understood that this disclosure may be scaled up or scaled down, depending upon the desired use, and dimensions are provided for exemplary use only.

The wedge tip 30 may be at the shallow-most portion of the wedge 20, at the end of the taper 28. This is shown as the right-most portion of the each wedge in FIG. 3. Each wedge 20 may have a length L, a width W, maximum depth $D_{max}$, and a minimum depth $D_{min}$, which tapers from the $D_{max}$ to the $D_{min}$.

Figure 4:
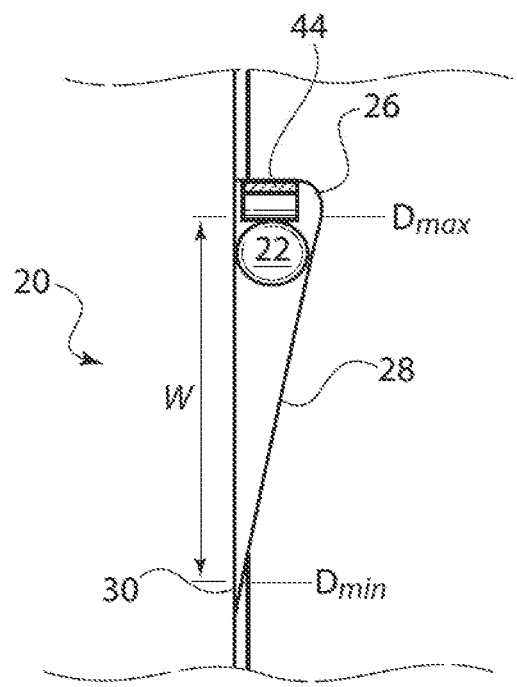
FIG. 4 is a cross-sectional view that shows one of the wedges of FIG. 3 with a needle roller positioned therein.

FIG. 4 shows a cross sectional view of a wedge 20, taken along the length L, such that the width W and $D_{max}$ and $D_{min}$ are visible. This figure shows a needle roller 22 in position at the curved groove 26 of the wedge 20.

Figure 5:
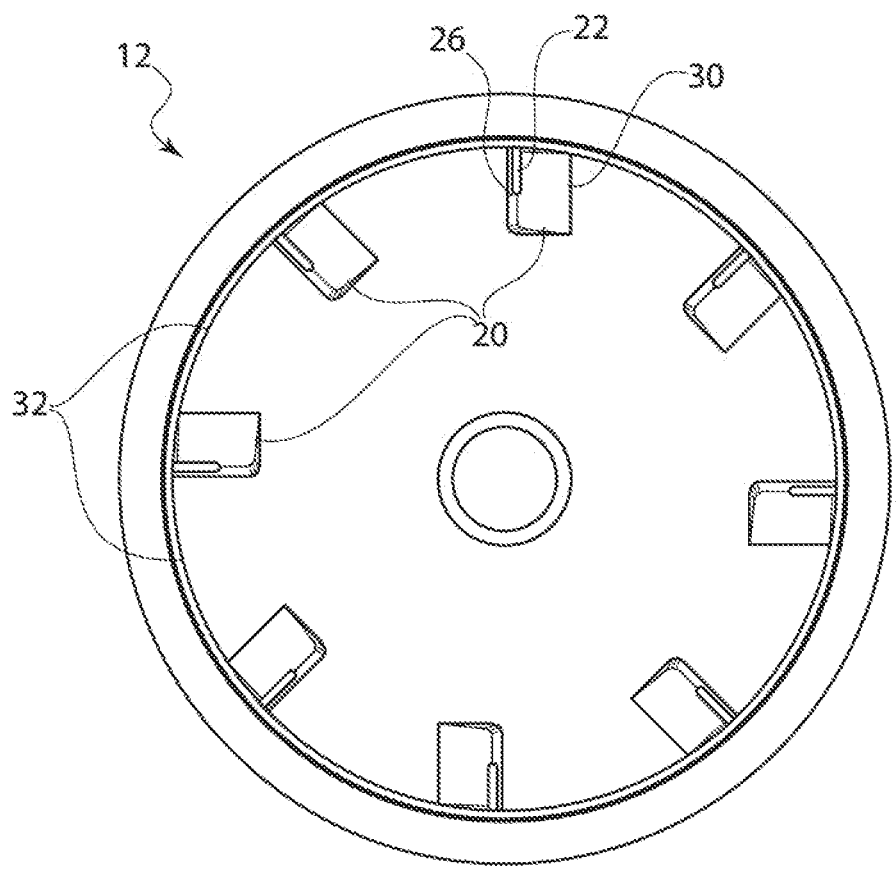
FIG. 5 is a cross-sectional view that shows the male segment shoulder of FIG. 3, showing the wedges and needle rollers positioned therein.

FIG. 5 shows a cross-sectional view of the male segment 12, taken along shoulder 16. This figure shows needle rollers 22 in place in the wedges 20, and illustrates the gradations of depth of the wedge 20. The rollers 22 are shown in a position prior to their becoming wedged in the narrower, tapered part 28 of the wedge 20. The rollers 22 are shown in the deeper curved groove 26. A plurality of wedges 20 are shown in a spaced-apart configuration. Shoulder locations 32 are present between the wedges 20. Although eight wedges 20 are shown, it should be understood that more or fewer wedges may be provided. It should be understood that the wedges 20 may be placed further apart or closer together. In one example, the wedges 20 are generally spaced about an equal distance apart. In one example, the wedges 20 are generally provided in an even number. This may help balance the torque pressure. It may generally be expected that a plurality of wedges 20 may be used. In one example, there may be a generally equivalent area of shoulder locations 32 as compared to wedge 20 area. In one example, there may be more shoulder location 32 area than wedge area (which is area removed from the shoulder 16).

Figure 6:
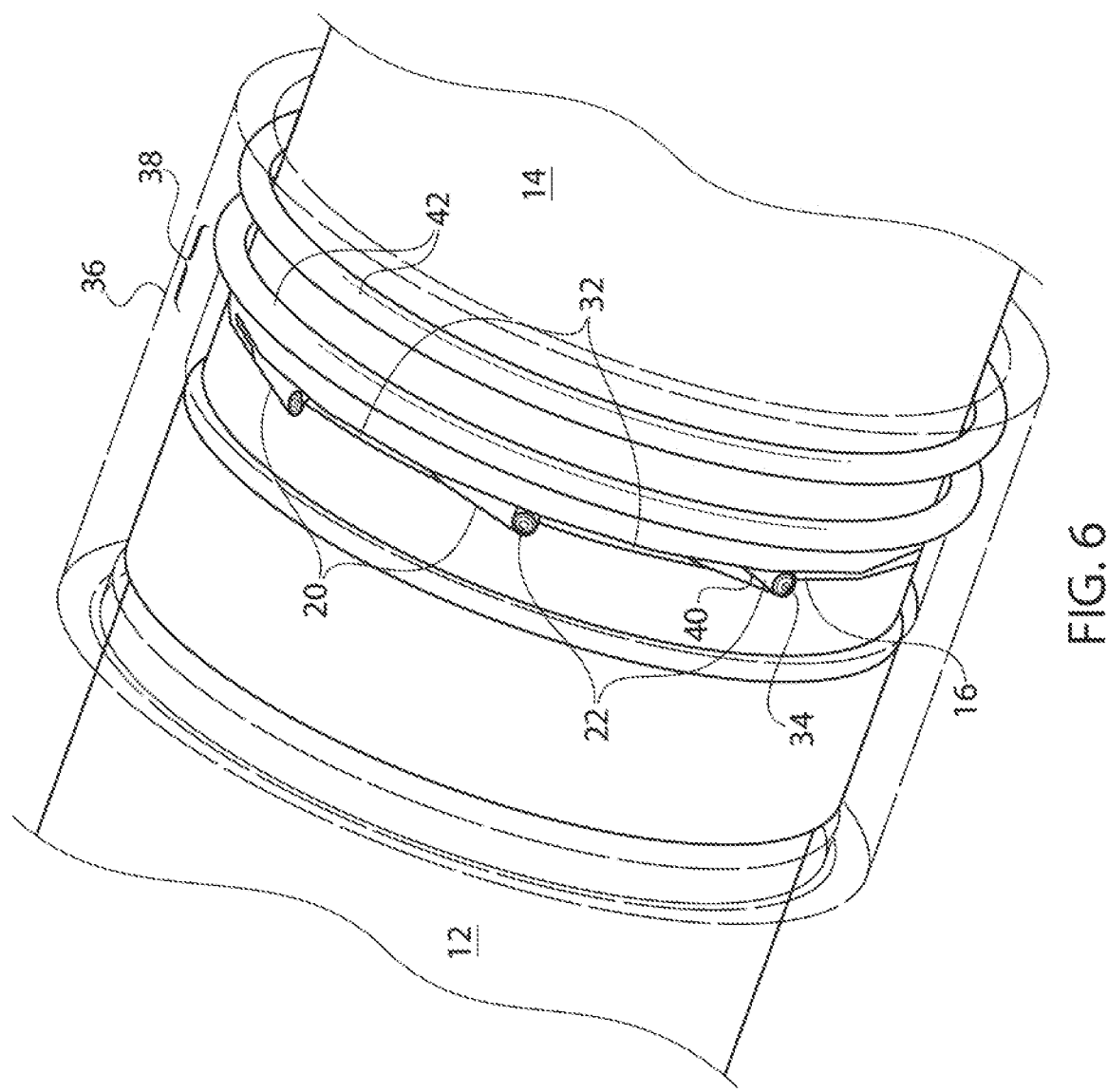
FIG. 6 is a side perspective view that shows an abutment of two segments, needle rollers in place in wedges, and a sleeve positioned over the abutment connection.

As shown in FIG. 6, in use, segments 12 and 14 are positioned such that they abut one another at an abutment connection 38. One or more needle rollers 22 may be positioned into one or more wedges 20 on the shoulder 16 of segment 12. FIG. 6 also shows a series of shoulder locations 32 that are positioned between the wedges. Shoulder locations 32 are locations where wedges 20 are not formed into the shoulder 16 such that the structural integrity of the shoulder 16 remains intact. FIG. 6 further shows a sleeve 36 positioned over the abutment connection 38 of segments 12 and 14. The sleeve 36 is shown transparently, so that the needle rollers 22 and abutment connection 38 are viewable.

FIG. 6 also shows the ends 34 and shafts 40 of the needle rollers 22 as they relate to the wedges 20. The needle rollers 22 may be any appropriate form of roller that may move with respect to or otherwise within the wedge 20 upon application of torque. In one example, the needle rollers 22 may comprise the type of rollers that are used in bearing cages, roller bearings, thrust bearings, transmissions, or any other type of bearing system. The shafts 40 of the needle rollers are generally longer than their diameter. (In some instances, needle rollers are defined as having shafts that are at least four times their diameter.) In one example, the needle rollers 22 may be about ⅛ inch in diameter. The size of needle rollers, however, depends upon the relative size of segments 12 and 14 and wedges 20. It should be understood that this disclosure may be scaled up or scaled down, depending upon the desired use, and that these dimensions are provided for exemplary use only.

The needle rollers 22 may be hollow or solid. They may be formed of any appropriate material that may withstand the intended extreme pressures and torques to be applied to segments 12 and 14. They may extend the full length of the wedge 20. Alternatively, they may extend only a partial length of the wedge 20, as shown in FIG. 5.

Once the segments 12 and 14 are positioned with the needle rollers 22 in place, the sleeve 36 may be positioned over the abutment connection 38. The sleeve 36 may help secure the connection. The sleeve 36 may help secure the needle rollers 22 in place. As shown in FIGS. 2 and 6, the sleeve may have one or more seal elements 42. The one or more seal elements 42 may be provided along a belly surface of the sleeve 36 in one or more grooves 37. The one or more seal elements 42 may be provided in order to effect a seal with respect to the segments 12 and 14. The one or more seal elements 42 may help prevent drilling fluids or other fluids or materials from disrupting the connection 10. The one or more seal elements 42 may be compressed as the sleeve moves over the abutment connection 38.

In use, torque against the male segment 12 in the direction of the arrow in FIG. 3 forces the needle rollers 22 away from the curved groove 26 and toward the wedge tip 30. This may cause the needle rollers 22 to become wedged, pinched, or otherwise lodged along the taper 28. This wedging may help prevent relative motion between the shoulder faces and prevent torque creep. This wedging may help prevent connection failure. This wedging may help the remaining shoulder locations 32 from becoming compromised or breaking. The connection 10 may allow the segments 12 and 14 to handle torque up to the shearing force of the one or more needle rollers 22 in use in the wedges 20. Whereas traditionally the shoulder 16 is the location that carries the most torque, providing one or more wedges 20 forces some of the torque bearing onto the needle rollers 22.

Figure 7:
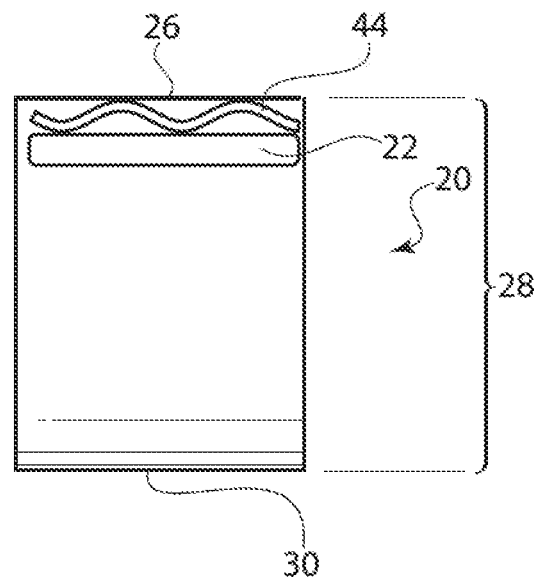
FIG. 7 is a top plan view that shows one of the wedges, having a needle roller in position and an optional spring.

FIG. 7 shows the placement of an optional spring 44. The spring 44 may be placed within the curved groove 26. The spring 44 may be positioned adjacent to the needle roller 22. If a spring were to be shown in the view of FIG. 5, it would be to the left of the needle roller 22 in each wedge 20. The spring 44 may urge the needle roller 22 toward the wedge tip 30. This may encourage the roller 22 to become wedged more quickly. This may lessen the amount that the segment 12 need to rotated in order for the roller 22 to engage the taper 28 and begin absorbing torque pressure. The amount that segment 12 needs to be rotated may be reduced via use of spring 44. The spring 44 may also help the roller 22 lock with little to no backlash.

Figure 8:
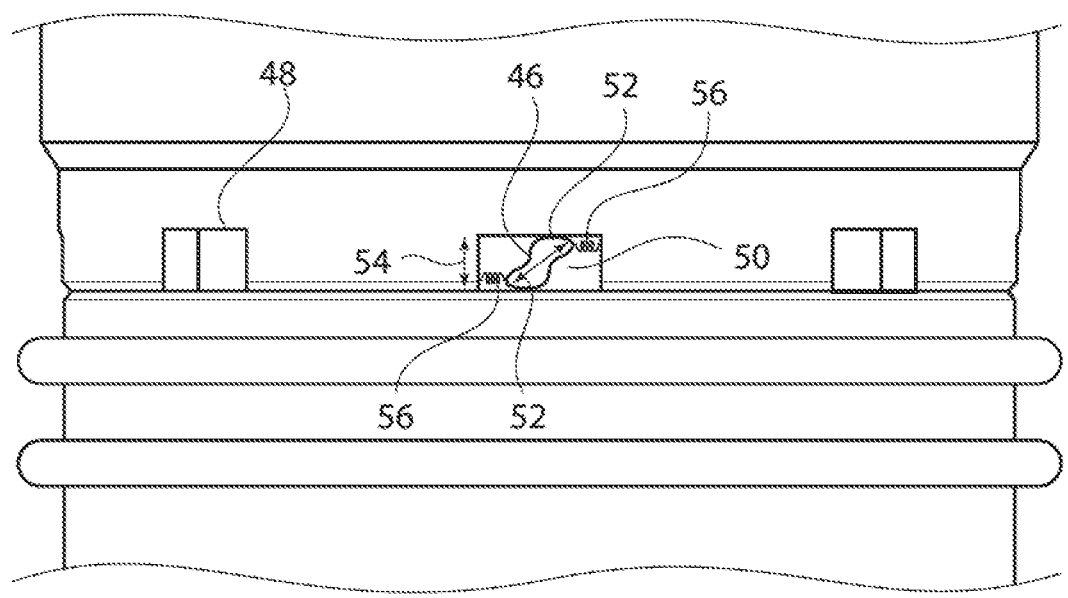
FIG. 8 is a top plan view that shows an alternate example of a high torque connection using a sprag in a cut-out portion.

FIG. 8 shows an alternate example that uses a sprag 46. The sprag 46 may function as a wedging element. This example includes one or more cut-out portions 48 in the shoulder 16. Although the cut-out portions 48 are shown as having a rectangular shape, it should be understood that other shapes are possible and within the scope of this disclosure. For example, the cut-out portions 48 may be square-shaped, oval-shaped, or any other appropriate shape. A sprag 46 may be positioned in the cut-out portion 48. The sprag 46 may be a figure-eight shaped structure. However, it should be understood that any other structure that may tilt within the cut-out 48 may be used.

The height 50 of sprag 46 may be defined as the distance between each of its tips 52. The height 50 of the sprag may be larger than the length 54 of the cut-out 48. Rather than having a rolling action, the sprag 46 may become wedged in the cut-out 48 when the segment 12 is rotated or when torque is applied thereto. Upon rotation of the segments, the sprag 46 may tilt (at least) slightly. This may create a wedge-like or jamming action in the cut-out portion 48. The tips 52 of the sprag 46 may contact the cut-out portion 48 edges. The tips 52 of the sprag 46 may absorb some of the torque that applied to the segment shoulder 16.

One or more optional springs 56 may be provided in order to help stabilize the sprag 46. For example, the spring(s) 56 may help maintain the sprag 46 at the desired angle. The springs 56 may also help reduce backlash of the sprag 46.

In some aspects, a lock connection for a high torque carrying connection may be provided according to one or more of the following examples.

Example 1

A lock for a high torque carrying connection, comprising first and second segments for connecting to one another at an abutment connection; the first segment comprising a first shoulder having a circumferential face with one or more wedges formed therealong, each of the one or more wedges comprising a tapered portion extending between a groove and a shallower wedge tip; and one or more wedging elements positioned within the one or more wedges, wherein the one or more wedging elements are radially constrained.

Example 2

The lock of Example 1 may have the one or more wedging elements comprising one or more needle rollers.

Example 3

The lock of Example 1 may feature a sleeve positioned over the abutment connection.

Example 4

The lock of Example 3 may feature a sleeve that comprises one or more sealing elements.

Example 5

The lock of Example 1 may feature a groove that comprises a curved groove located at a deep-most portion of the wedge.

Example 6

The lock of Example 1 may feature one or more wedges that comprise a triangular cross-section.

Example 7

The lock of Example 1 may feature the tapered portion of the one or more wedges extending along at least a portion of the circumferential face of the first shoulder.

Example 8

The lock of Example 1 may feature the first shoulder further comprising shoulder locations without a wedge formed therein.

Example 9

The lock of Example 1 may feature each of the one or more wedging elements wedging in the tapered portion of each of the wedges upon application of torque to one of the first or the second segments.

Example 10

The lock of Example 1 may feature a spring positioned adjacent the one or more wedging elements in each of the one or more wedges.

Example 11

The lock of Example 1 may feature the one or more wedges comprising an even number of wedges that are substantially equidistant from one another.

Example 12

A lock for a high torque carrying connection, comprising first and second segments for connecting to one another at an abutment connection; the first segment comprising a first shoulder having a circumferential face with one or more cut-out portions formed therealong; and one or more sprags positioned within the one or more cut-out portions for wedging.

Example 13

The lock of Example 12 may feature a sleeve positioned over the abutment connection.

Example 14

The lock of Example 13 may feature a sleeve that comprises one or more sealing elements.

Example 15

The lock of Example 12 may feature the sprag comprising a height and the cut-out portion comprises a length, and wherein the sprag height is greater than the cut-out portion length.

Example 16

The lock of Example 12 may feature one or more springs to secure the one or more sprags in place.

Example 17

The lock of Example 12 may feature the one or more cut-out portions extending along at least a portion of the circumferential face of the first shoulder.

Example 18

The lock of Example 12 may feature the first shoulder comprising shoulder locations without a cut-out formed therein.

Example 19

The lock of Example 12 may feature the one or more cut-out portions comprising an even number of cut-out portions that are substantially equidistant from one another.

Example 20

A method for increasing a torque carrying capacity of segments joined via a locked connection, comprising providing first and second segments, the first segment comprising a first shoulder having a circumferential face with one or more wedges formed therealong, each of the one or more wedges comprising a tapered portion extending between a groove and a shallower wedge tip; providing one or more wedging elements positioned within the one or more wedges; positioning a sleeve over an abutment connection between the first and second segments; and applying a torque to one of the first or the second segments.

The foregoing description, including illustrated aspects and examples, has been presented only for the purpose of illustration and description and is not intended to be exhaustive or to limiting to the precise forms disclosed. Numerous modifications, adaptations, and uses thereof will be apparent to those skilled in the art without departing from the scope of this disclosure.

What is claimed is:

1. A lock for a high torque carrying connection, comprising:
   first and second segments for connecting to one another at an abutment connection;
   the first segment comprising a first shoulder having a circumferential face with a plurality of wedges formed along the circumferential face, each of the wedges comprising a tapered portion extending between a groove and a shallower wedge tip; and
   a wedging element positioned within each of the wedges, wherein the wedging element is configured to move away from the groove and along the tapered portion toward the wedge tip upon application of torque to one of the first or second segments,
   wherein the one or more wedging elements comprise one or more needle rollers.

2. The lock of claim 1, wherein the groove comprises a curved groove located at a deep-most portion of the wedge.

3. The lock of claim 1, wherein the one or more wedges comprise a triangular cross-section.

4. The lock of claim 1, wherein the tapered portion of the one or more wedges extends along at least a portion of the circumferential face of the first shoulder.

5. The lock of claim 1, wherein the first shoulder further comprises shoulder locations without a wedge formed therein.

6. The lock of claim 1, wherein each of the one or more wedging elements wedge in the tapered portion of each of the wedges upon application of torque to one of the first or the second segments.

7. The lock of claim 1, further comprising a spring positioned adjacent the one or more wedging elements in each of the one or more wedges.

8. The lock of claim 1, wherein the one or more wedges comprise an even number of wedges and are substantially equidistant from one another.

9. A lock for a high torque carrying connection, comprising:
   first and second segments for connecting to one another at an abutment connection;
   the first segment comprising a first shoulder having a circumferential face with a plurality of wedges formed along the circumferential face, each of the wedges comprising a tapered portion extending between a groove and a shallower wedge tip; and
   a wedging element positioned within the each of the wedges, wherein the wedging element is configured to move away from the groove and along the tapered portion toward the wedge tip upon application of torque to one of the first or second segments; and
   a sleeve positioned over the abutment connection.

10. The lock of claim 9, wherein the sleeve comprises one or more sealing elements.

11. A lock for a high torque carrying connection, comprising:
    first and second segments for connecting to one another at an abutment connection;

the first segment comprising a first shoulder having a circumferential face with a plurality of cut-out portions formed therealong; and one or more sprags positioned within the cut-out portions, the one or more sprags comprising a structure that tilts within the cut-out portion upon application of torque for wedging; and a sleeve positioned over the abutment connection.

12. The lock of claim 11, wherein the sleeve comprises one or more sealing elements.

13. The lock of claim 11, wherein the sprag comprises a height and the cut-out portion comprises a length, and wherein the sprag height is greater than the cut-out portion length.

14. The lock of claim 11, further comprising one or more springs to secure the one or more sprags in place.

15. The lock of claim 11, wherein the one or more cut-out portions extend along at least a portion of the circumferential face of the first shoulder.

16. The lock of claim 11, wherein the first shoulder further comprises shoulder locations without a cut-out formed therein.

17. The lock of claim 11, wherein the one or more cut-out portions comprise an even number of cut-out portions and are substantially equidistant from one another.

18. A method for increasing a torque carrying capacity of segments joined via a locked connection, comprising:

providing first and second segments, the first segment comprising a first shoulder having a circumferential face with a plurality of wedges formed along the circumferential face, each of the wedges comprising a tapered portion extending between a groove and a shallower wedge tip;

providing a wedging element positioned within each of the wedges;

positioning a sleeve over an abutment connection between the first and second segments; and applying a torque to one of the first or the second segments.

* * * * *